US011537650B2

(12) United States Patent
Rudden et al.

(10) Patent No.: US 11,537,650 B2
(45) Date of Patent: Dec. 27, 2022

(54) HYPERPLANE OPTIMIZATION IN HIGH DIMENSIONAL ONTOLOGY

(71) Applicant: International Business Machines Corporation, Armonk, NY (US)

(72) Inventors: Mary Rudden, Denver, CO (US); Craig M. Trim, Ventura, CA (US); Leo Kluger, Spring Valley, NY (US); Abhishek Basu, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 16/914,410

(22) Filed: Jun. 28, 2020

(65) Prior Publication Data

US 2021/0406298 A1  Dec. 30, 2021

(51) Int. Cl.
| | |
|---|---|
| *G06F 17/00* | (2019.01) |
| *G06F 16/36* | (2019.01) |
| *G06Q 10/10* | (2012.01) |
| *G06K 9/62* | (2022.01) |
| *G09B 5/12* | (2006.01) |
| *G06F 16/34* | (2019.01) |

(52) U.S. Cl.
CPC .......... *G06F 16/367* (2019.01); *G06F 16/345* (2019.01); *G06K 9/6269* (2013.01); *G06Q 10/1053* (2013.01); *G09B 5/12* (2013.01)

(58) Field of Classification Search
CPC ... G06F 16/367; G06F 16/345; G06K 9/6269; G06Q 10/1053; G09B 5/12
USPC ............................. 707/739; 705/311; 706/12
See application file for complete search history.

(56) References Cited

U.S. PATENT DOCUMENTS

| | | | |
|---|---|---|---|
| 8,060,451 | B2 | 11/2011 | Degeratu et al. |
| 10,347,151 | B2 | 7/2019 | Contractor et al. |
| 2003/0177027 | A1 | 9/2003 | DiMarco |
| 2010/0233663 | A1 | 9/2010 | Pennington et al. |

(Continued)

FOREIGN PATENT DOCUMENTS

| | | |
|---|---|---|
| CN | 105279255 A | 1/2016 |
| CN | 109299473 A | 2/2019 |
| WO | 202003325 A1 | 1/2020 |

OTHER PUBLICATIONS

Basu Mallick, Chiradeep, "Why Upskilling and Reskilling Are the Future of Workplace L&D," HR Technologist, Aug. 19, 2019, 5 pages, https://www.hrtechnologist.com/articles/learning-development/upskillingreskilling-are-future-of-workplace-learning-and-development/.

(Continued)

*Primary Examiner* — Charlotte M Baker
(74) *Attorney, Agent, or Firm* — Grant Johnson (57) ABSTRACT

A computer-implemented method for generating a description of a target skill set using domain specific language, a computer program product, and a system. Embodiments may comprise, on a processor, ingesting a data set related to the target skill from a data store, semantically analyzing the data set to generate a skill ontology, generating a hyperplane to separate one or more priority skills from among the plurality of related skills, generating a description for the target skill from the one or more priority skills, and presenting the generated description to a user. The skill ontology may include relationships between the target skill and a plurality of related skills.

25 Claims, 4 Drawing Sheets

(56) References Cited

U.S. PATENT DOCUMENTS

| | | | |
|---|---|---|---|
| 2011/0119212 A1* | 5/2011 | De Bruin | A61B 5/00 |
| | | | 706/12 |
| 2013/0246290 A1* | 9/2013 | Courson | G06F 40/205 |
| | | | 705/311 |
| 2014/0278633 A1 | 9/2014 | Daly et al. | |
| 2015/0379112 A1 | 12/2015 | Lau et al. | |
| 2017/0364850 A1 | 12/2017 | Johnston et al. | |
| 2019/0146986 A1 | 5/2019 | Dewan et al. | |
| 2021/0173831 A1* | 6/2021 | Crabtree | G06N 5/02 |

OTHER PUBLICATIONS

Gaul, Patty, "A Strategic Approach to Upskilling and Reskilling," Association for Talent Development, May 8, 2019, 16 pages, from https://www.td.org/insights/a-strategic-approach-to-upskilling-and-reskilling.

Kovács-Ondrejkovic, et al., "Decoding Global Trends in Upskilling and Reskilling," BCG, Nov. 5, 2019, 24 pages, https://www.bcg.com/publications/2019/decoding-global-trends-upskilling-reskilling.aspx.

* cited by examiner

HYPERPLANE OPTIMIZATION IN HIGH DIMENSIONAL ONTOLOGY

BACKGROUND

The present disclosure relates to ontology definition, and more specifically, to hyperplane optimization across an ontology.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One area to which computer systems have been applied is project management, and in particular, to tools that help organizations find candidates with the right set of knowledge, skills, and experience to perform tasks. One well-known technique for candidate selection is to post a hand-written job description to an online website, and then solicit a curriculum vitae ("CV") from recipients. The CV helps to identify candidate qualifications, such as educational background, job history, skills or knowledge, experience, or the like. The job description, in turn, helps those candidates identify what skills are needed by the employer.

Despite these tools, 79% of chief executives in a recent survey indicated that they regularly worry about finding employees with the skills their organization needs. Similar studies have indicated that the vast majority of current employees are willing to learn new skills to qualify for a new job and/or to advance their careers. Whatever the motivation behind their desire to learn new skills, many employees may have trouble determining what skills are necessary and how they can acquire those skills. For example, an employee may not understand which courses and certificates act as prerequisites for the desired position, at what proficiency a person should have before attempting to take those courses and tests, what gaps a person should address to achieve that position, what learning materials are associated with attaining the desired skill, and the like. As another example, a person may know which skill they desire to learn, but not know where to start and what learning plan to follow to reach their goal.

SUMMARY

According to embodiments of the present disclosure, a computer-implemented method for generating a description of a target skill set using domain specific language. Embodiments may comprise, on a processor, ingesting a data set related to the target skill from a data store, semantically analyzing the data set to generate a skill ontology, generating a hyperplane to separate one or more priority skills from among the plurality of related skills, generating a description for the target skill from the one or more priority skills, and presenting the generated description to a user. The skill ontology may include relationships between the target skill and a plurality of related skills.

According to embodiments of the present disclosure, a method of defining a learning plan to a skill set. Embodiments may comprise, using a processor, ingesting a data set related to a target skill, semantically analyzing the data set to generate a skill ontology, generating a hyperplane optimization across the skill ontology to separate one or more priority skills from among the plurality of related skills, and generating a learning plan for the target skill from the one or more priority skills. The skill ontology may include relationships between the target skill and a plurality of related skills.

According to embodiments of the present disclosure, a method for automatically generating an open seat description. Embodiments may comprise ingesting a data set related to a target skill, semantically analyzing the data set to generate a skill ontology, generating a hyperplane to separate one or more priority skills from among the plurality of related skills, and generating an open seat description for the target skill from the one or more priority skills. The skill ontology may include relationships between the target skill and a plurality of related skills.

According to embodiments of the present disclosure, a computer program product for generating a description of a target skill set using domain specific language. The computer program product may comprise one or more computer readable storage media, and program instructions collectively stored on the one or more computer readable storage media. The program instructions in some embodiments may comprise program instructions to ingest a data set related to the target skill, program instructions to semantically analyze the data set to generate a skill ontology, and program instructions to generate a hyperplane to separate one or more priority skills from among the plurality of related skills. The skill ontology may include relationships between the target skill and a plurality of related skills.

According to embodiments of the present disclosure, a system for generating a description of a target skill set using domain specific language, comprising a processor operably connected to a memory. The memory may contain program instructions to, when executed on the processor, ingest a data set related to the target skill, semantically analyze the data set to generate a skill ontology, and generate a hyperplane to separate one or more priority skills from among the plurality of related skills. The skill ontology may include relationships between the target skill and a plurality of related skills.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to ontology definition; more particular aspects relate to hyperplane optimization across an ontology. While the present disclosure is not necessarily limited to such applications, various aspects of the disclosure may be appreciated through a discussion of various examples using this context.

Employers and employees can both benefit from a tool that helps match knowledge and skills to job descriptions. One technical problem with developing such a tool, however, is that the underlying data (e.g., a set of CVs or a business plan) is often unstructured and terse. Another technical problem is that most potential keywords are often either too specific (and thus filter out viable candidates), or are overly general (and thus, the selection process will suffer from excess noise). For example, a keyword search for "software engineer" will not return candidates who list themselves as "computer programmers," even though these two titles are generally understood by those in the software field as being equivalent. Conversely, a keyword search for "artificial intelligence" (or AI) may identify individuals with widely different skill sets, from experts in training AI models, to experts in the application of those AI models to specific problems, to experts in the underlying algorithms. This problem is particularly acute in specialist categories, where required skills may be both highly specific and largely unknown to the generalist staff who typically write and manage job postings.

Accordingly, embodiments of the disclosure may include a system that can auto-generate a job posting (also known as an open seat description) using domain-specific technical language for a non-linear job role (i.e., jobs for which there is not a clear set of credentials and advancement path). Some embodiments may include auto-generating open seat descriptions based on graph-based relationships calculated from common data sets, such as the CVs of current employees, internal directories, general employment oriented networking websites, websites catering to specific technical fields, etc. Some embodiments may also define an ontology using those data sets, and then use a hyperplane optimization across the ontology to define a high-precision description of a target skill or set of skills. In this way, some embodiments provide the ability to match candidates with positions without requiring detailed knowledge of those very skills.

Some embodiments may also apply the resulting high-precision description of a skill set to identify candidates, either internal or external, for upskilling (i.e., developing the desired skills). That is, some embodiments may be used to identify skills related to the target skill, develop an open seat job description directed to those related skills, and then develop a customized learning plan and/or curriculum that the organization can use to quickly and effectively develop the targeted skills in candidates who are strong in those related skills.

One illustrative example assumes a large organization desires to find employees with quantum computing (QC) skills, either via hiring new employees or by upskilling existing employees. Those skilled in the art will recognize that, while this illustrative example focuses on QC and upskilling candidates, this disclosure is not limited to these particular skill sets and/or use case.

One initial problem with the goal presented in this illustrative example is that QC skills are quite rare worldwide, and may be particularly rare in any specific organization. Another problem is that QC is an emerging technology, and thus, is often used to refer to a wide variety of disparate technologies and skills.

Starting with the upskill side of the illustrative example, a search for "quantum computing" of the CVs within one particular organization may find a strong affinity between existing employees with QC skills and existing employees with "artificial intelligence" (AI) skills. That such a relationship exists may not in itself be surprising, but if the affinity analysis had ended there, the results would have been of limited use to the organization, as the terms "quantum computing" and "artificial intelligence" are both broad terms, and their definitions vary based on the background of the practitioner answering the question, as well as the organizations they work/have worked within.

To address these and other challenges, some embodiments of the disclosure may automatically generate an ontology from the data set of employee CVs, etc. The ontology, in turn, may define AI by detecting affinity to critical skills that make up this space. For example, "Python," "Data Science," "Machine Learning," as well as "Programming" and "Research" skills may all be defined within the calculated ontology as contributing to an AI skill-set. Moreover, this calculated ontology may exist independent of governmental or outside definitions of a typical AI skill-set (although it may overlap a generally-known set of skills). Instead, the associations may be calculated by analyzing all available relevant source information (all CVs, resumes, badges, learning, certifications, etc.) for that specific organization. In this way, some embodiments may create a customized ontology that defines the target skill and/or related skill as those terms are actually used within that particular organization. The customized ontology, in turn, may be used to generate the custom open seat description, as well as provide a road map to what related skills are helpful, or even necessary, to practice the targeted skill in that particular organization. That road map, in turn, can be correlated against existing curriculum, or may be used to enhance that curriculum.

Some embodiments may utilize this approach both for hard, technical skills (e.g., model training, quantum circuits, etc.) and soft, people-oriented skills (e.g., sales, marketing, management). In the later set of targeted skills, for example, an ontology may be developed from the data set that defines "manager" by demonstrating an affinity to critical skills that make up this space, such as "performance assessment," "budget," "modeling," "leadership," and the like.

Figure 1:
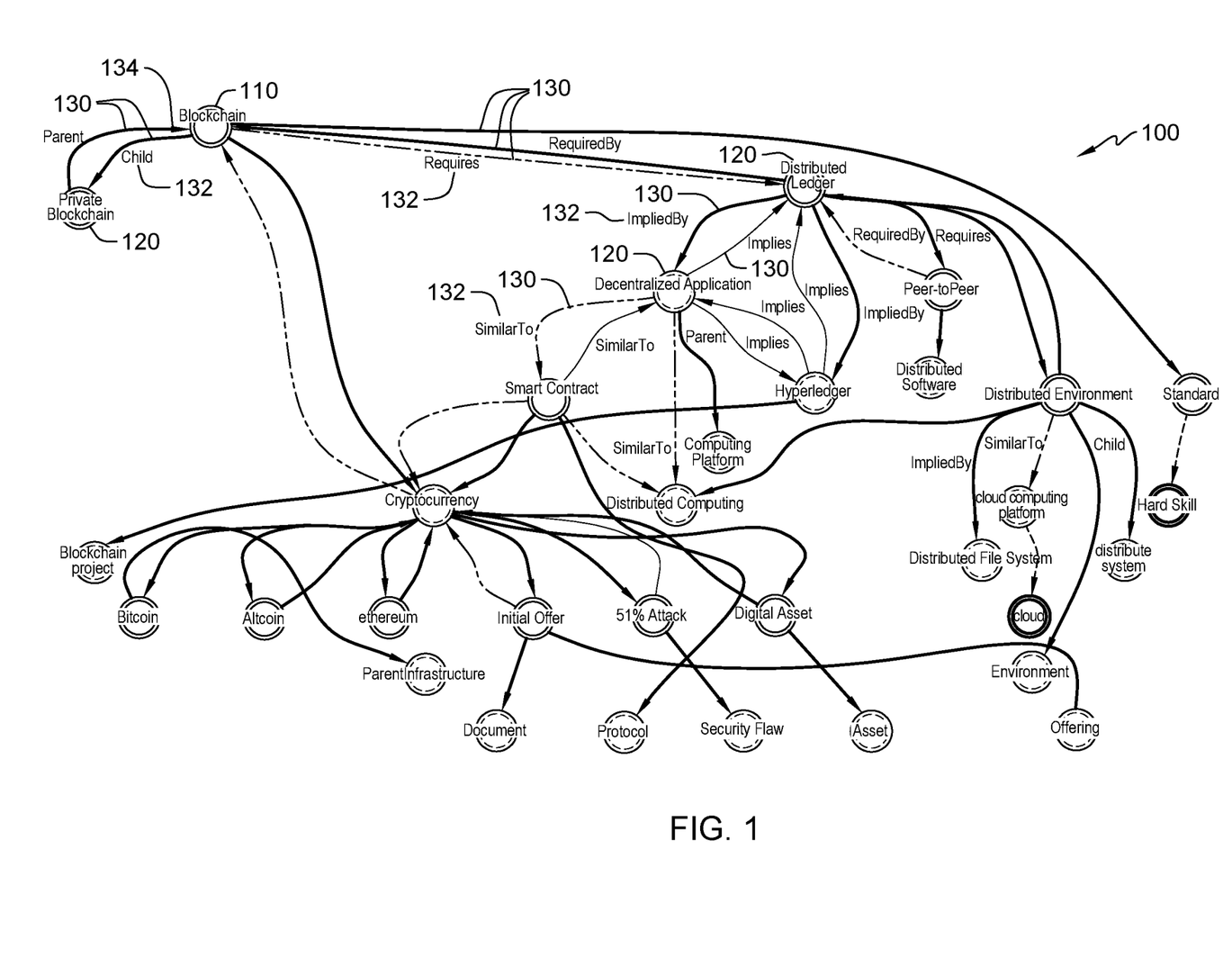
FIG. 1 is relationship diagram of the affinity relationships for an illustrative example, consistent with some embodiments and with only some elements labeled for clarity.

FIG. 1 is relationship diagram 100 of the affinity relationships for an illustrative example, consistent with some embodiments and with only some of elements labeled for clarity. This illustrative relationship diagram 100 may represent the result of an analysis of the CVs of the existing employees at one sample organization for the skill "blockchain." This diagram 100 embodiment includes a target skill 110 surrounded by a plurality of secondary skills 120 that have calculated affinity relationships 130 to the primary skill 110, directly and/or via one or more of the other secondary skills 120. The affinity diagram 100 in FIG. 1 is consistent with a relatively sparse but highly connected ontology, which is typical for relatively emerging skills. This spare and highly connected result indicates that, although there are few entities, each object has high confidence in connection with the core topic. A more mature technology area, in contrast, may produce a relatively denser ontology.

Each affinity relationship 130 in turn, may have an associated affinity type 132 and an affinity direction 134. As will be described in more detail with reference to FIG. 4, some of the affinity types 132 are stronger than others (e.g., "requires" is typical of a strong relationship, whereas "similar to" is typical of a weaker relationship). Likewise, some of the skills 110, 120 are interconnected by more than one path, such as the two-way link between "Blockchain" and "Distributed Ledger," or by multiple paths, such as from "Decentralized applications" to "Distributed Computing" via both "Smart Contract" and "Hyperledger."

The illustrative affinity diagram 100 in FIG. 1 will further vary if the system is trained on a different set of data, for example, the employee CVs at some other organization. For example, the use of the term AI in the resulting ontology may have some variance that would reflect the respective cultures of those organizations from which the data sources were obtained. These cross-organization nuances can be exploited in some embodiments by combining data sets to generate a larger, more representative sample that could reveal additional relationships and that may be useful for certain applications of this disclosure (e.g., curriculum enhancement by a university).

Figure 2:
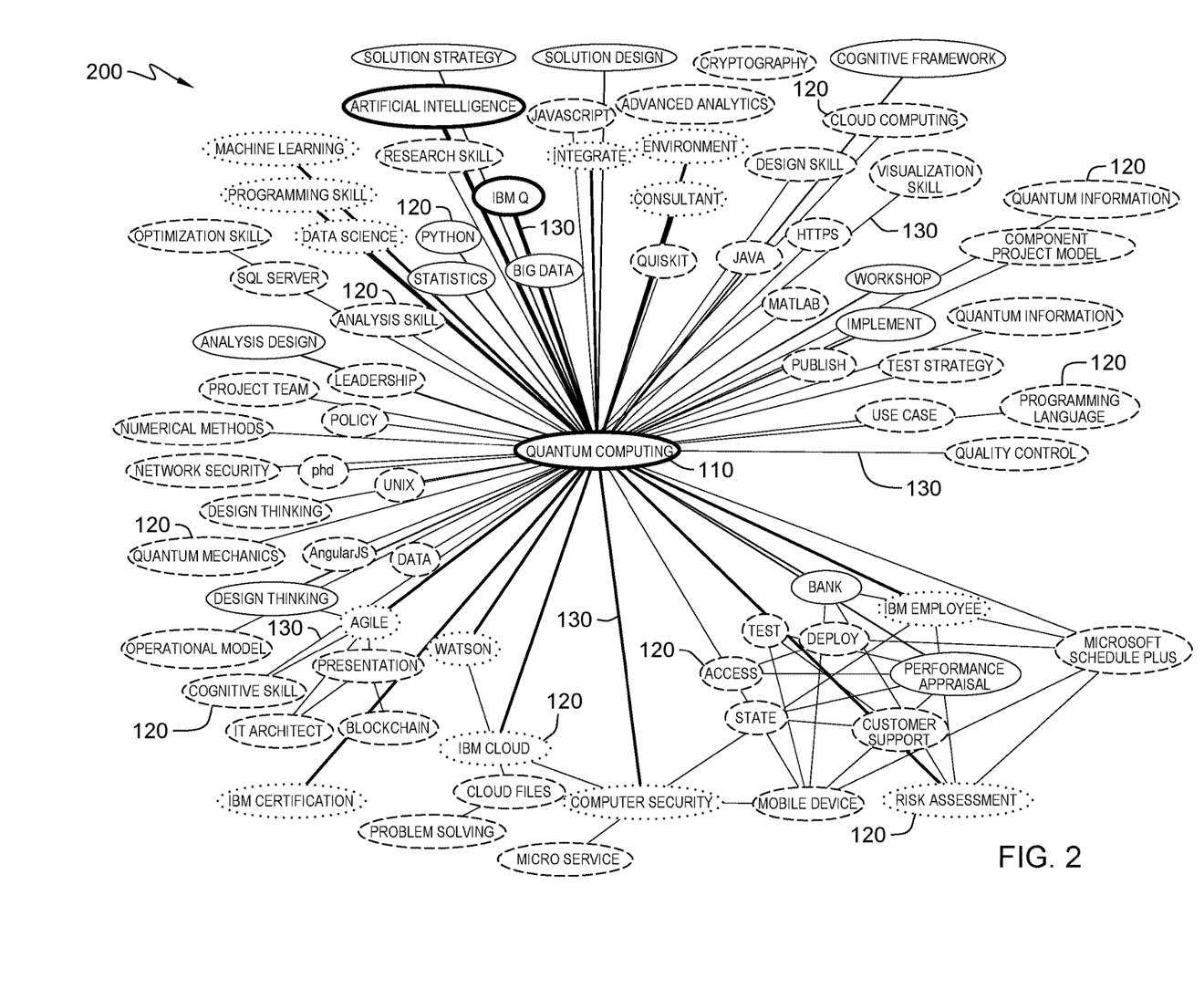
FIG. 2 is a cyclic graph of the affinity relationships for another illustrative example, consistent with some embodiments and with only some elements labeled for clarity.

FIG. 2 is a cyclic graph 200 of the affinity relationships 130 for another illustrative example, consistent with some embodiments and with only some elements labeled for clarity. In this cyclic graph 200, the affinity types 132 in FIG. 1 have been assigned scores, which are then added together (inversely weighted by the number of intermediate jumps) for each of the various paths from one skill 110 to another skill 120. The result of this analysis is that some of the skills 110, 120 are more strongly related to each other than other of the skills 110, 120. This strength score is depicted in several ways in FIG. 2, including physical proximity between the two skills, the width and intensity of the affinity relationship 130 between the two skills, and their perimeter definitions (e.g., dots vs dashes vs solid perimeter and width). Likewise, this is not a coarse-grained path analysis. That is, these embodiments may consider the full context available. Edge weighting in FIG. 2 demonstrates the approximate distance (as a requirements metric) for each skill set. As shown, the affinity relationship 130 for "Solution Strategy" (which is backed by an entire sub-graph) has more value to "AI" than "Statistics." Still, both skills have a nearly equal bearing with respect to "Machine Learning."

Continuing the illustrative example from an upskilling perspective, FIG. 2 indicates that an organization (which typically has limited funding for development) looking to grow its QC skills (as that specific organization actually uses that term) should select candidate employees based on those with affinity in "Artificial Intelligence" (as that specific organization actually uses that specific term). In this illustrative example, they should further look for candidates with backgrounds in "Python," "Data Science," and "Machine Learning," as demonstrated by possessing the related skills and applying them to projects (using, for example, a public code repository) will be the most likely candidates for successful upskilling.

For search targets that have a large number of entities but sparse connectivity (e.g., a target in a mature technology area), the relationship between any two terms (e.g., "Distributed File System" and "Distributed Ledger") may not necessarily be strong enough to confidently infer that, in the majority of cases, practitioners who have the prior experience will also have the latter. However, the relationship may be sufficient to conclude that those same practitioners have an affinity of some degree towards the secondary skill, and thus, may be worth categorizing/considering as secondary or lower-priority candidates. Whereas, for practitioners who have "Distributed Ledger" expertise, the connectivity back to "Blockchain" as a core concept is very strong. In this case, it is possible to infer that experience with "Distributed Ledger" technology either implies direct experience with "Blockchain" or, at the very least, that such capability is not going to be difficult for the practitioner to acquire.

A degree of connectivity may be employed in some embodiments to map a learning plan to a given skill. In these embodiments, a high degree of connectivity between two disparate subjects implies that the secondary skill area should be prioritized above other skills found in the data set. Because the system in some embodiments can quantify the relationship intensity, the prioritization decision becomes clear, reduces risk of a sub-optimal result (e.g., spending time learning and/or teaching a less-useful topic), and also reduces uncertainly. For example, if a practitioner or an educational entity wants to build a skill set in QC, some embodiments can map out and progressively build a learning plan by dynamically assessing components within the affinity analysis. In this example application, it may be desirable to focus on the analysis most directly related to the corpus for which the practitioner is a member.

As with the upskilling example, this learning plan is highly-specific to the organization from which the data set was drawn. Another large organization, for example, may have a different bias around preferred technology, and thus, the route to defining what a technology is, the learning plan could differ. Thus, a learning plan in one organization could involve one set of technologies, whereas in another, it might involve a completely different set of technologies.

One feature and advantage of some embodiments of this disclosure is that they may interpret and quantify the relationship and permutations across tens of thousands of hard and soft skills with high precision, and thus, can perform the analysis noted in this disclosure for any one of those skills. The system in these embodiments may begin its search by finding all the relationships within the ontology-backed graph space with some connection (either explicit or inferable) to a target skill. Employing this analysis, some embodiments can write an open seat description that includes high-affinity words for individuals who may be relatively more likely to be worth investing time in upskilling. Significantly, those high-affinity words will be tailored to how that particular organization uses those terms.

Another feature and advantage of some embodiments is that organizations, including educational entities like vocational schools, colleges, universities, coding camps, and the like, can identify emerging and needed critical skills that may not yet be well known except to practicing developers or other practitioners at the cutting edge. Accordingly, in some embodiments, the system could act as an "early-warning system" to alert the organization of forthcoming skill requirements, as well as helping individual practitioners identify requisite skills that they need to acquire to remain relevant in their fields.

Data Processing System

Figure 3:
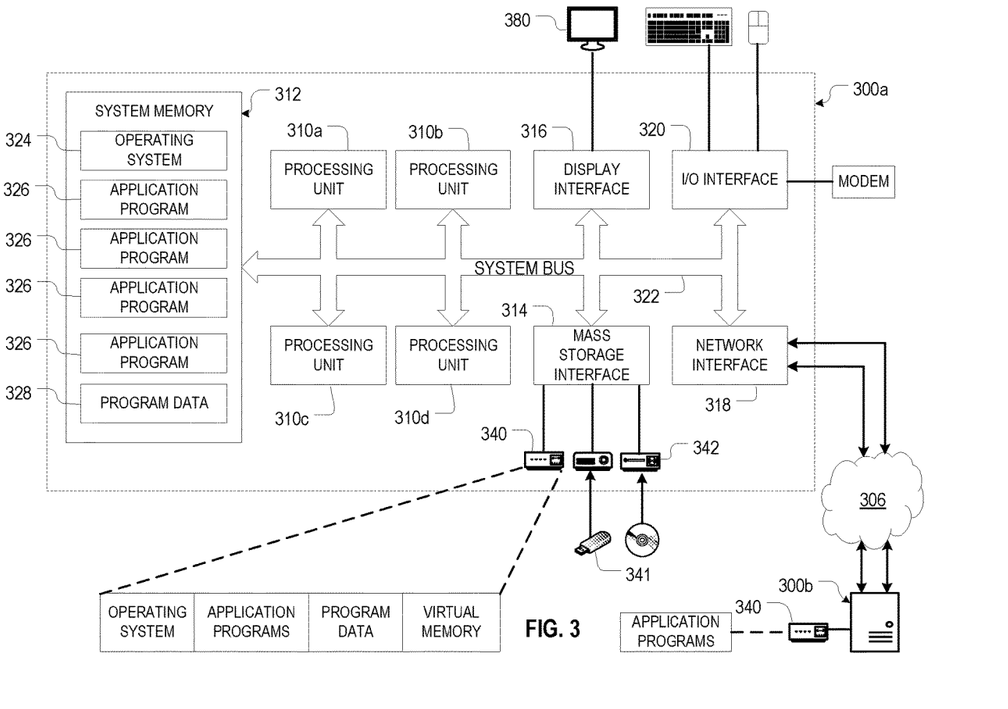
FIG. 3 illustrates an embodiment of a data processing system (DPS) suitable for performing hyperplane optimization in high dimensional ontology, consistent with some embodiments.

FIG. 3 illustrates an embodiment of a data processing system (DPS) 300 suitable for performing hyperplane optimization in high dimensional ontology, consistent with some embodiments. In some embodiments, the DPS 300 may be implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

The data processing system 300 in FIG. 3 may include a plurality of central processing units 310 *a*-310 *d* (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340, universal serial bus ("USB") storage device 341, or a readable/writable optical disk drive 342. The network interfaces 318 may allow the DPS 300*a* to communicate with other DPS 300*b* over the communications medium 306. The memory 312 may also contain an operating system 324, a plurality of application programs 326, and program data 328.

The DPS 300 embodiment in FIG. 3 may be a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the DPS 300 may comprise a single processor system and/or a single processor designed to emulate a multiprocessor system. Further, the processors 310 may be implemented using a number of heterogeneous DPS 300 in which a main processor is present with secondary processors on a single chip. As another illustrative example, the processor 310 may be a symmetric multi-processor system containing multiple processors of the same type.

When the DPS 300 starts up, the associated processor(s) 310 may initially execute the program instructions that make up the operating system 324, which manages the physical and logical resources of the DPS 300. These resources may include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 341, 342, which are in communication with the processors 310 through the system bus 322. The program code in the different embodiments may be embodied on different physical or tangible computer readable media, such as the system memory 312 or the mass storage devices 340, 341, 342. In the illustrative example in FIG. 3, the instructions may be stored in a functional form of persistent storage on the direct access storage device 340. These instructions may then be loaded into the memory 312 for execution by the processor 310. However, the program code may also be located in a functional form on the computer readable media 342 that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 341, 342 may work cooperatively to store the operating system 324, the application programs 326, and the program data 328. In the illustrated embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 341, 342.

Although the operating system 324, the application programs 326, and the program data 328 are illustrated as being contained within the memory 312, some or all of them may be physically located on different computer systems and may be accessed remotely, e.g., via the communication medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interfaces 314, 316, 318, 320 support communication with a variety of storage and I/O devices. The mass storage interface 314 may support the attachment of one or more mass storage devices 340, 341, 342, which are typically rotating magnetic disk drive storage devices, a solid-state storage device (SSD) that uses integrated circuit assemblies as memory to store data persistently, typically using flash memory, or a combination of the two. However, the mass storage devices 340, 341, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 may be used to directly connect one or more display units, such as monitor 380, to the DPS 300. These display units 380 may be non-intelligent (i.e., dumb) terminals, such as an LED monitor, or may themselves be fully programmable workstations used to allow IT administrators and customers to communicate with the DPS 300. Note, however, that while the display interface 316 is provided to support communication with one or more display units 380, the DPS 300 does not necessarily require a display unit 380 because all needed interaction with customers and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 306. The Transmission Control Protocol/Internet Protocol ("TCP/IP") suite contains suitable network and transport protocols.

Ontology Generation

Figure 4:
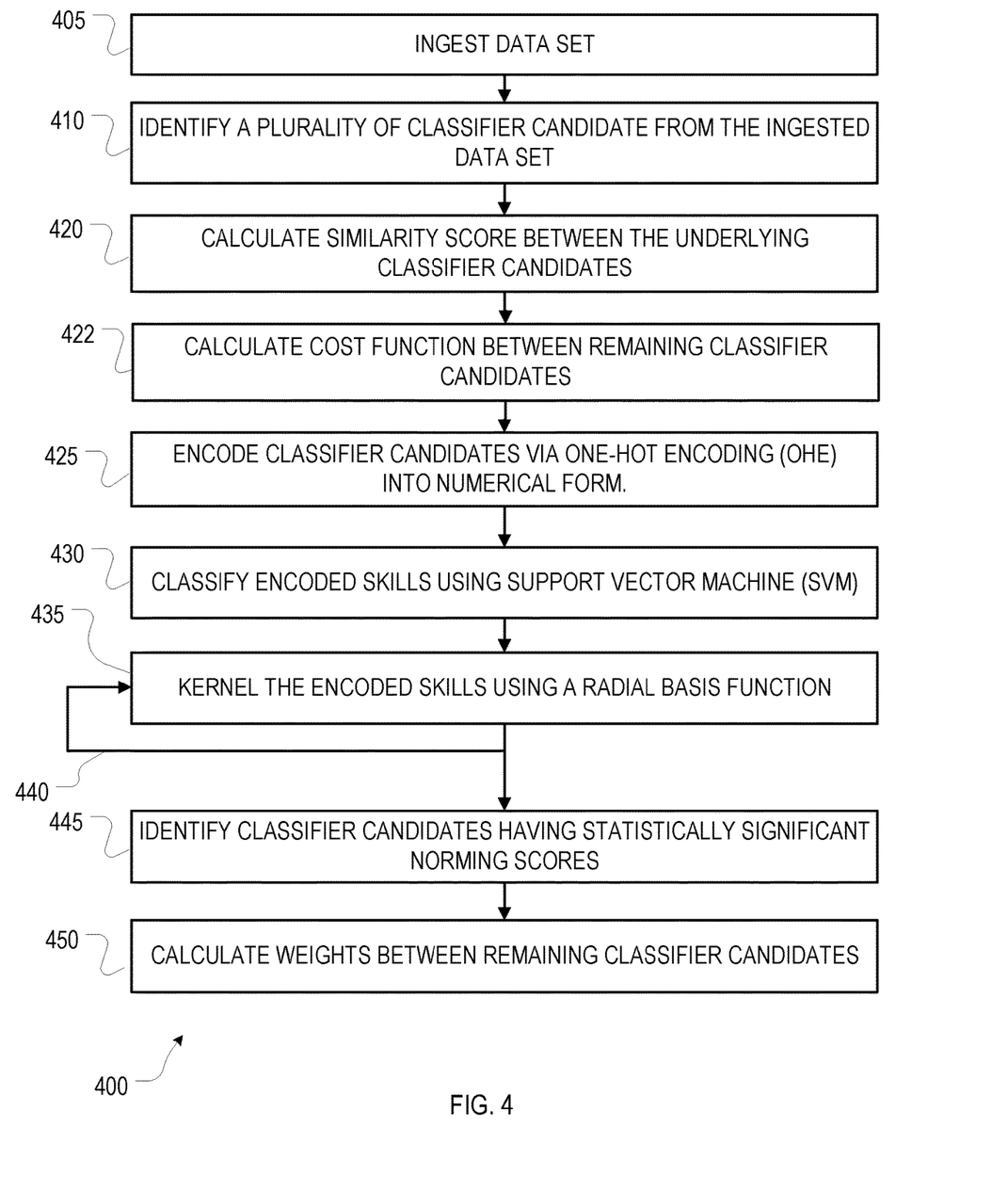
FIG. 4 is a flow chart illustrating one method of generating an ontology from a data set, consistent with some embodiments of the invention.

FIG. 4 is a flow chart illustrating one method 400 of generating an ontology from a data set, consistent with some embodiments of the invention. At operation 405, the system ingests a data set from a data store, such as a data set of CVs from existing employees, internal directories, and human resource databases and/or from information scraped from general employment oriented networking websites, websites catering to specific industry groups, etc. The system may then calculate a plurality of classifier candidates (e.g., nouns, verbs) from the ingested data set at operation 410 by identifying terms having relatively high frequency use. Linguistic analysis may then be used to identify connector phrases and/or relationships between those candidate terms.

At operation 420, some embodiments may calculate a similarity score, such as a Jaccard similarity coefficient, between each of the underlying classifier candidates to group the candidates into clusters/groups, thereby merging similar terms into the same skill. More specifically, some embodiments may define a Jaccard similarity coefficient as the size of the intersection divided by the size of the union of label sets under consideration:

$$J(y, \hat{y}) = \frac{|y \cap \hat{y}|}{|y \cup \hat{y}|} = \frac{|y \cap \hat{y}|}{|y| + |\hat{y}| - |y \cup \hat{y}|}$$

where y and $\hat{y}$ represent the different label sets. The matrixed output of this operation may show the corrected and wrong predictions, in comparison with the actual labels. Some embodiments may also utilize external data sources at operation 420, such as dictionaries, thesauri, government employment categories, and the like to merge some candidate classifiers found at operation 410. At operation 422, a cost function may be defined to determine the existence, causational direction, and strength of relationships between the remaining candidate classifiers. Some embodiments may supplement the cost function by using linguistic analysis and/or neural nets on the data source to identify relationships and the causational direction of those relationships.

Next, at operation 425, the entities identified at operation 420 are encoded via one-hot encoding (OHE) into a numerical form. Some embodiments may then map the OHE encoded data to a high-dimensional feature space at operation 430 so that extracted entities within the ontology (as applied to the unstructured text in the corpus) could be categorized. In many applications, a three-dimensional feature space was found be sufficient.

Significantly, some concepts in some applications may not be strictly separable in a linear sense. In these applications, a non-linear separator for the data may be calculated that can function in the non-linear space. The separator in these embodiments works as a multi-dimensional divider (i.e., a hyperplane) to perform the classification. When using applications operating in two-dimensional space, there may be no need for a hyperplane as such. Instead, a line (i.e., a curve) may be sufficient and can be used to divide the space into categories where each class exists within a group.

To optimize the hyperplane separator, some embodiments may use a modified support vector machine (SVM) to classify skills at operation 430 to simplify the number of dimensions and/or identify those dimensions that are most contributing to the target skill. Moreover, in cases with non-linear relationships, some embodiments may further kernel the data using a radial basis function to calculate the distance between skills in the multi-dimensional state at operation 435. In particular, some embodiments may calculate a hyperplane that represents the most significant margin between categories per the function:

$$y(x) = \Sigma_{i=1}^{N} w_i \psi(|x - x_i|)$$

where x is the target skill, $x_i$ is the current skill, $w_i$ is a series of weighting coefficients for the radial basis function, and $\psi$ and the parenthetical expression represent the actual radial functions i.e., a set of N random functions, usually non-linear. The resulting calculated ontology (as defined by the data, within the strict OWL methodology parameters) may be both a taxonomy of concepts with multiple semantic relationships in some embodiments. Accordingly, these embodiments may be trained on a customized weighting of semantic relationships by numerous iterations of this method (represented by flow indicator 440), and some embodiments may find a weighting that minimizes the overall loss function.

Loss minimization in some embodiments may involve taking certain semantic constructs that represent similarity and equivalency, grouping them together, and then then taking other semantic constructs that indicate a component-wise or partonomous relationship and grouping them together. Subsequently, all other semantic relationships form the third group. Each group learns a weight and the weighting of concepts distributed in a bell-shape with low kurtosis.

At operation 445, any point along that distribution that had a statistically significant deviation above a norming score (e.g., distribution mean) and/or z score is used to identify significant statistical deviations from the mean.

Skill pairs that have low norming scores may further indicate similar terms and/or skills that are likely to be easily trained. Skills that have high norming scores, in contrast, may be considered different enough to deserve a new category in some embodiment. One advantage of embodiments using this approach is that they may present a conceptual measure for finding a hyperplane within a calculated ontology.

When complete, the method expressed above, involving the customization of trained weights along with distributed categories, permits some embodiments to use a gradient descent algorithms for finding the overall loss function as well as support vectors at operation 450.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A computer-implemented method for generating a description of a target skill set using domain specific language, comprising, on a processor:
   ingesting a data set related to the target skill from a data store;
   semantically analyzing the data set to generate a skill ontology, wherein the skill ontology includes relationships between the target skill and a plurality of related skills;
   generating a hyperplane to separate one or more priority skills from among the plurality of related skills;
   generating a description for the target skill from the one or more priority skills; and
   presenting the generated description to a user.

2. The method of claim 1, wherein the generated description comprises a job posting.

3. The method of claim 2, wherein the job posting comprises specific technical language for a non-linear job role.

4. The method of claim 1, wherein the generated description comprises a learning plan for the target skill.

5. The method of claim 1, wherein semantically analyzing the data set to generate the skill ontology comprises defining a Jaccard similarity coefficient between each of the plurality of related skills.

6. The method of claim 5, further comprising combining at least two of the plurality of related skills into skill groups.

7. The method of claim 1, wherein semantically analyzing the data set to generate the skill ontology comprises encoding the plurality of related skills using one-hot encoding (OHE).

8. The method of claim 7, wherein semantically analyzing the data set to generate the skill ontology further comprises mapping the OHE encoded data to a high-dimensional feature space.

9. The method of claim 8, wherein semantically analyzing the data set to generate the skill ontology further comprises calculating a separator within the high-dimensional feature space.

10. The method of claim 9, wherein semantically analyzing the data set to generate the skill ontology further comprises applying a support vector machine (SVM) to the separator.

11. The method of claim 1, wherein semantically analyzing the data set comprises generating an ontology using graph-based relationships in the data sets.

12. A method of defining a learning plan to a skill set, comprising, using a processor:
    ingesting a data set related to a target skill;
    semantically analyzing the data set to generate a skill ontology, wherein the skill ontology includes relationships between the target skill and a plurality of related skills;
    generating a hyperplane optimization across the skill ontology to separate one or more priority skills from among the plurality of related skills; and
    generating a learning plan for the target skill from the one or more priority skills.

13. The method of claim 12, wherein semantically analyzing the data set to generate the skill ontology comprises defining a Jaccard similarity coefficient between each of the plurality of related skills to combine at least two of the plurality of related skills into skill groups.

14. The method of claim 12, wherein semantically analyzing the data set to generate the skill ontology comprises:
    encoding the plurality of related skills using one-hot encoding (OHE);
    mapping the OHE encoded data to a high-dimensional feature space;
    calculating a separator within the high-dimensional feature space; and
    applying a support vector machine (SVM) to the separator.

15. A method for automatically generating an open seat description, comprising:
    ingesting a data set related to a target skill;
    semantically analyzing the data set to generate a skill ontology, wherein the skill ontology includes relationships between the target skill and a plurality of related skills;
    generating a hyperplane to separate one or more priority skills from among the plurality of related skills; and
    generating an open seat description for the target skill from the one or more priority skills.

16. The method of claim 15, wherein semantically analyzing the data set to generate the skill ontology comprises defining a Jaccard similarity coefficient between each of the plurality of related skills to combine at least two of the plurality of related skills into skill groups.

17. The method of claim 16, wherein semantically analyzing the data set to generate the skill ontology comprises:
    encoding the plurality of related skills using one-hot encoding (OHE);
    mapping the OHE encoded data to a high-dimensional feature space;
    calculating a separator within the high-dimensional feature space; and
    applying a support vector machine (SVM) to the separator.

18. A computer program product for generating a description of a target skill set using domain specific language, the computer program product comprising:
    one or more computer readable storage media, and program instructions collectively stored on the one or more computer readable storage media, the program instructions comprising:

program instructions to ingest a data set related to the target skill;

program instructions to semantically analyze the data set to generate a skill ontology, wherein the skill ontology includes relationships between the target skill and a plurality of related skills; and program instructions to generate a hyperplane to separate one or more priority skills from among the plurality of related skills.

19. The computer program product of claim 18, further comprising program instructions to define a Jaccard similarity coefficient between each of the plurality of related skills to combine at least two of the plurality of related skills into skill groups.

20. The computer program product of claim 19, further comprising program instructions to:

encode the plurality of related skills using one-hot encoding (OHE);

map the OHE encoded data to a high-dimensional feature space;

calculate a separator within the high-dimensional feature space; and apply a support vector machine (SVM) to the separator.

21. A system for generating a description of a target skill set using domain specific language, comprising a processor operably connected to a memory, the memory containing program instructions to, when executed on the processor:

ingest a data set related to the target skill;

semantically analyze the data set to generate a skill ontology, wherein the skill ontology includes relationships between the target skill and a plurality of related skills; and generate a hyperplane to separate one or more priority skills from among the plurality of related skills.

22. The system of claim 21, further comprising program instructions to:

generate a description for the target skill from the one or more priority skills, wherein the generated description comprises a job posting; and presenting the job posting to a user.

23. The system of claim 21, wherein semantically analyzing the data set to generate the skill ontology comprises defining a Jaccard similarity coefficient between each of the plurality of related skills to combine at least two of the plurality of related skills into skill groups.

24. The system of claim 23, wherein semantically analyzing the data set to generate the skill ontology comprises:

encoding the plurality of related skills using one-hot encoding (OHE);

mapping the OHE encoded data to a high-dimensional feature space;

calculating a separator within the high-dimensional feature space; and applying a support vector machine (SVM) to the separator.

25. The system of claim 21, further comprising program instructions to:

generate a description for the target skill from the one or more priority skills, wherein the generated description comprises a learning plan for the target skill; and presenting the learning plan to a user.

* * * * *